United States Patent [19]
Mori et al.

[11] Patent Number: 5,778,662
[45] Date of Patent: Jul. 14, 1998

[54] CONTROL APPARATUS AND METHOD FOR INTERNAL COMBUSTION ENGINE

[75] Inventors: Koichi Mori, Sagamihara; Takayuki Toshiro, Fujisawa; Kimiyoshi Nishizawa, Yokohama, all of Japan

[73] Assignee: Nissan Motor Co., Ltd., Kanagawa, Japan

[21] Appl. No.: 678,204

[22] Filed: Jul. 11, 1996

[30] Foreign Application Priority Data

Jul. 12, 1995 [JP] Japan .................... 7-176016

[51] Int. Cl.⁶ .................... F01N 3/20; F01N 3/36
[52] U.S. Cl. .................... 60/274; 60/285
[58] Field of Search .................... 123/339.11; 60/274, 60/276, 285, 286, 290

[56] References Cited

U.S. PATENT DOCUMENTS

| | | | |
|---|---|---|---|
| 4,027,478 | 6/1977 | Masaki et al. | 60/285 |
| 4,132,198 | 1/1979 | Masaki et al. | 60/285 |
| 4,233,811 | 11/1980 | Masaki | 60/274 |
| 4,658,789 | 4/1987 | Morita | 123/422 |
| 4,660,535 | 4/1987 | Asano | 123/425 |
| 4,745,741 | 5/1988 | Masui et al. | 60/274 |
| 5,207,057 | 5/1993 | Kayanuma | 60/285 |
| 5,560,202 | 10/1996 | Hosoya et al. | 60/285 |
| 5,657,625 | 8/1997 | Koga et al. | 60/274 |

FOREIGN PATENT DOCUMENTS 6-81696   3/1994   Japan.

*Primary Examiner*—Willis R. Wolfe
*Attorney, Agent, or Firm*—McDermott, Will & Emery

[57] ABSTRACT

In control apparatus and method for an internal combustion engine, an incremental correction coefficient for a basic fuel injection (supply) quantity is carried out in such a way that an excess coefficient at an inlet portion of a three-way catalytic converter interposed in an exhaust passage of the engine gives a predetermined value and a retardation correction quantity by which a basic ignition advance angle (ADV) is retarded is determined when a secondary air is supplied into a portion of the exhaust passage which is located upstream with respect to the catalytic converter and an engine driving condition falls in an idling state.

15 Claims, 5 Drawing Sheets

CONTROL APPARATUS AND METHOD FOR INTERNAL COMBUSTION ENGINE

BACKGROUND OF THE INVENTION

1. Field of The Invention

The present invention relates to a control apparatus and method for an internal combustion engine and particularly relates to the control apparatus and method for the internal combustion engine which can achieve a quick rise in temperature of a catalytic converter used to purify an exhaust gas.

2. Description of The Background Art

A Japanese Patent Application First Publication No. Heisei 6-81696 published on Mar. 22, 1994 exemplifies a previously proposed control apparatus for an internal combustion engine in which a rise characteristic in temperature of a three-way catalytic converter can be improved.

In the previously proposed control apparatus disclosed in the above-identified Japanese Patent Application First Publication, while the engine falls in an idling state and a (externally supplied) secondary air (not intake air quantity) is supplied to a portion of an exhaust passage of the engine which is located upstream with respect to the catalytic converter, an increment of a fuel supply quantity or a retardation of an ignition timing is carried out up to a stability limit of the engine.

Consequently, an exhaust gas temperature can positively be increased during the engine idling state at which the exhaust gas temperature is lowered without worsening the stability of the engine. Hence, the temperature in an inlet portion of the catalytic converter rises so that a quicker (or earlier) activation of the catalytic converter can be achieved.

It is noted, however, that the stability limit of the engine is varied according to an engine driving condition, a fuel characteristic, and so forth. Therefore, when the ignition timing is controlled up the stability limit, the ignition timings are varied in the vicinity to the varied stability limit (variations of the ignition timings occur). This causes the exhaust gas temperature to be accordingly varied. In addition, since an intake air quantity is different according to an instantaneous engine temperature even if the engine falls in the idling state, an excess coefficient (air-fuel mixture ratio) at the inlet portion of the catalytic converter is also accordingly varied with the secondary air supplied to the portion of the exhaust passage upstream with respect to the catalytic converter. Consequently, it becomes difficult for the quicker (or earlier) rise in temperature of the three-way catalytic converter to be sufficiently and stably achieved.

SUMMARY OF THE INVENTION

It is, therefore, an object of the present invention to provide a control apparatus and method for an internal combustion engine which can stably control an excess coefficient at an inlet portion of a three-way catalytic converter with a quantity of secondary air supplied, can achieve a retardation correction of an ignition timing (basic ignition timing advance angle) of the engine without worsening a stability of the engine, and can achieve the sufficient and stable rise in a temperature of the catalytic converter installed in an exhaust passage of the engine.

The above-described object can be achieved by providing a control apparatus for an internal combustion engine, comprising:

a) secondary air supplying means, having an air pump, for operatively supplying a secondary air into a portion of an exhaust passage of the engine located upstream with respect to a three-way catalytic converter interposed in the exhaust passage;

b) engine driving condition detecting means for detecting an engine driving condition, said engine driving condition detecting means including an engine idling sensor which is so constructed and arranged as to detect whether the engine enters an engine idling state, an airflow meter which is so constructed and arranged as to detect an intake air quantity supplied to the engine, and an air-fuel mixture ratio sensor which is so constructed and arranged in the portion of the exhaust passage located upstream with respect to the catalytic converter as to detect an air-fuel mixture ratio of the engine;

c) a control unit which is so constructed and arranged as to determine whether the engine falls in the idling state and determine whether the secondary air is supplied by said secondary air supplying means to the portion of the exhaust passage of the engine located upstream with respect to the catalytic converter, as to determine a basic fuel supply quantity on the basis of the detected engine driving condition and a supplied quantity of the secondary air, as to estimate an excess coefficient at an inlet portion of the catalytic converter on the basis of the detected air/fuel mixture ratio and the supplied quantity of the secondary air when determining that the engine falls in the idling state and that the secondary air is supplied into the portion of the exhaust passage located upstream with respect to the catalytic converter, as to determine an incremental correction quantity percentage of fuel supplied to the engine for the basic fuel supply quantity so that the excess coefficient gives a predetermined value, and as to determine a retardation correction quantity of an ignition timing for a basic ignition advance angle value according to the determined incremental correction percentage;

d) fuel supplying means for supplying a final fuel supply quantity determined according to the basic fuel supply quantity and the incremental correction quantity percentage to the engine derived by said control unit; and e) an ignition device which is so constructed and arranged as to ignite the fuel supplied to the engine at the basic ignition timing advance angle value which is retarded by the retardation correction quantity determined by said control unit.

The above-described object can also be achieved by providing a method for controlling a fuel supply quantity and an ignition timing of an internal combustion engine, said engine being provided with a) secondary air supplying means, having an air pump, for operatively supplying a secondary air into a portion of an exhaust passage of the engine located upstream with respect to a three-way catalytic converter interposed in the exhaust passage; and b) engine driving condition detecting means for detecting an engine driving condition, said engine driving condition detecting means including an engine idling sensor which is so constructed and arranged as to detect whether the engine enters an engine idling state, an airflow meter which is so constructed and arranged as to detect an intake air quantity supplied to the engine, and an air-fuel mixture ratio sensor which is so constructed and arranged in the portion of the exhaust passage located upstream with respect to the catalytic converter as to detect an air-fuel mixture ratio of the engine, said method comprising the steps of;

c) determining whether the engine falls in the idling state and whether the secondary air is supplied by said secondary air supplying means to the portion of the exhaust passage of the engine located upstream with respect to the catalytic converter;

d) determining a basic fuel supply quantity on the basis of the detected engine driving condition and a quantity of the secodary air;

e) estimating an excess coefficient at an inlet portion of the catalytic converter on the basis of the detected air/fuel mixture ratio and a supplied quantity of the secondary air when determining that the engine falls in the idling state and that the secondary air is supplied into the portion of the exhaust passage located upstream with respect to the catalytic converter;

f) determining an incremental correction quantity percentage of fuel supplied to the engine for the basic fuel supply quantity so that the excess coefficient gives a predetermined value; and g) determining a retardation correction quantity of an ignition timing for a basic ignition advance angle value according to the determined incremental correction percentage.

BEST MODE FOR CARRYING OUT THE INVENTION

Reference will hereinafter be made to the drawings in order to facilitate a better understanding of the present invention.

Figure 1A:
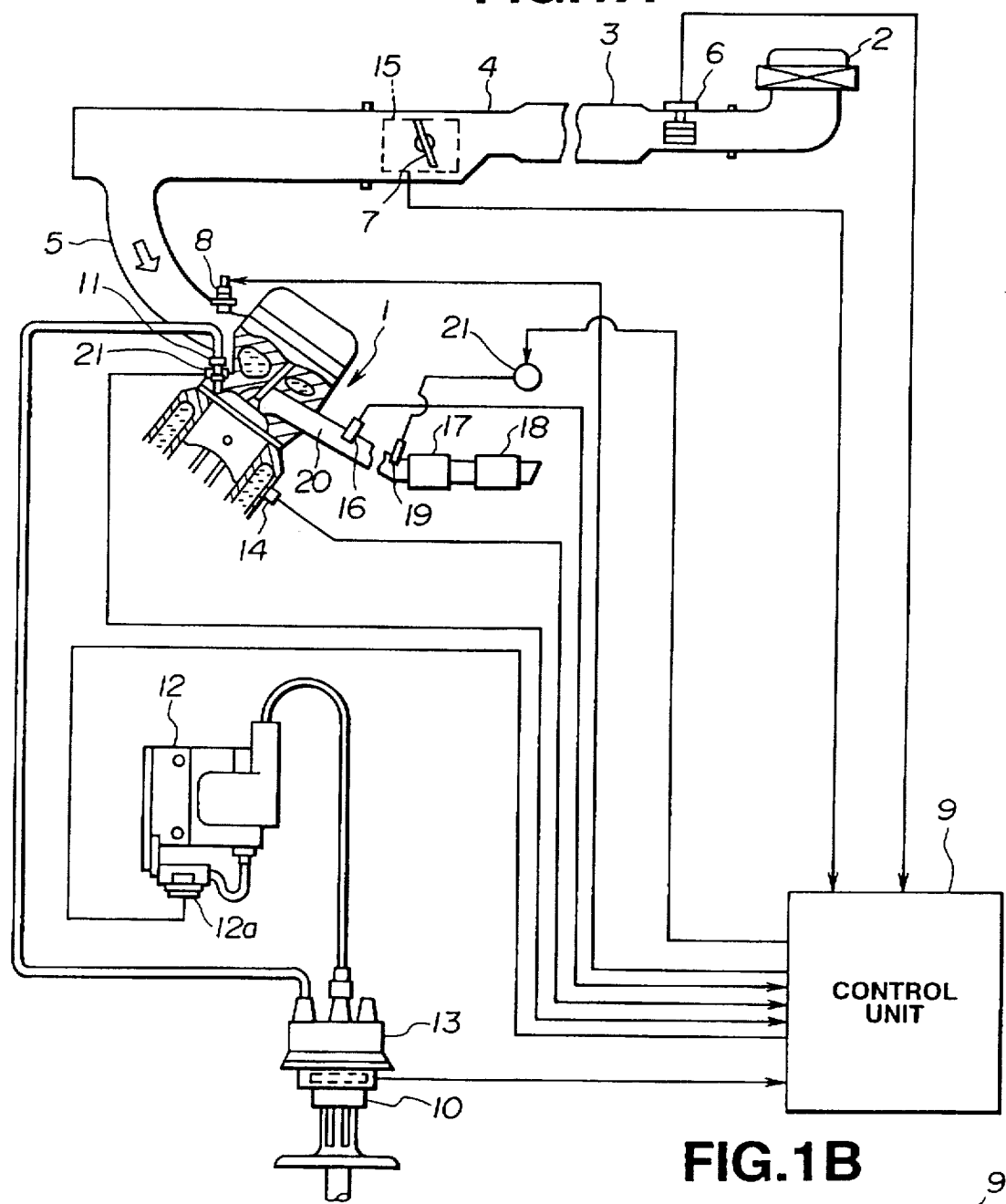
FIG. 1A is a schematic diagram of a control apparatus in a preferred embodiment according to the present invention which is applicable to an internal combustion engine.
Figure 1B:
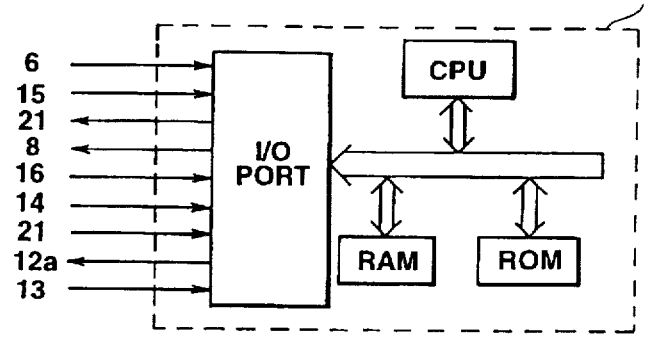
FIG. 1B is a circuit block diagram of a control unit shown in FIG. 1A.

FIGS. 1A and 1B show a control apparatus applicable to an internal combustion engine in a preferred embodiment according to the present invention.

Figure 2:
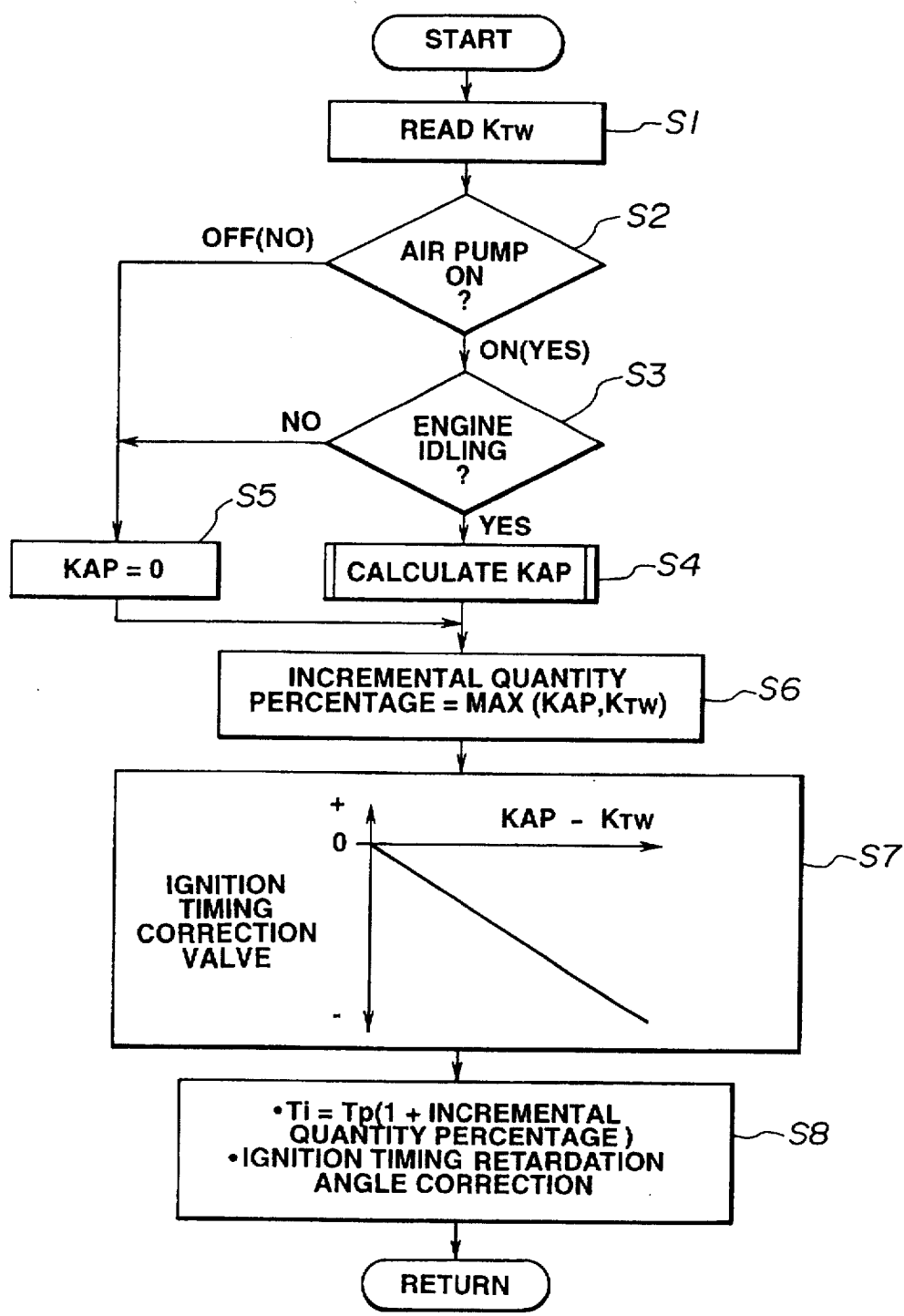
FIG. 2 is an operational flowchart executed by the control unit in the embodiment for explaining a control operation of a fuel injection quantity and of an ignition timing.

In FIG. 2, an internal combustion engine 1 is provided with an air cleaner 2, an intake duct 3, a throttle chamber 4, and an intake manifold 5. An intake air is sucked into each engine cylinder via the air cleaner 2, the intake duct 3, the throttle chamber 4, and the intake manifold 5.

An airflow meter 6 is disposed within the intake duct 3 so as to detect an intake air quantity Q. A throttle valve 7 is installed within a throttle chamber 4 which is associated with an accelerator pedal (not shown) so as to control the intake air quantity Q. A throttle sensor 15 is additionally installed on the throttle valve 7 so as to detect an opening angle TVO of the throttle valve 7 and output a voltage signal according to the opening angle TVO and has a function as an idling switch which is turned on to indicate that the throttle valve 7 is completely closed.

Alternatively, an idling switch may be additionally installed within the throttle chamber 4 and the idling switch may be turned on when the throttle valve 7 is placed at the fully closed position.

An electromagnetic fuel injection valve 8 is installed within the intake manifold 5 for each engine cylinder. A fuel supplied from a fuel pump and pressurized under a predetermined pressure by means of a pressure regulator is injected into the engine 1 in response to a pulse signal supplied to the electromagnetic portion of the valve 8, the pulse signal being developed in a control unit 9 as will be described later.

Referring to FIG. 1B, the control unit 9 includes a microcomputer having a CPU (Central Processing Unit), a RAM (Random Access Memory), a ROM (Read Only Memory), a common bus, and an I/O Port.

The control unit 9 calculates a basic fuel injection (supply) quantity $Tp=K \times Q/N$ (K denotes a constant) on the basis of the intake air quantity Q detected by the airflow meter 6 and an engine revolution speed N calculated from an output signal from a crank angle sensor 10 incorporated into a distributor 13.

Various kinds of corrections are made for the basic fuel injection quantity Tp so as to set a final fuel injection (supply) quantity Ti in the control unit 9. A drive pulse signal having a pulsewidth corresponding to the final fuel injection quantity Ti is output to each fuel injection valve 8 in synchronization with an engine revolution in a predetermined order so that each fuel injection valve 8 is intermittently opened during a time (pulsewidth) corresponding to the final fuel injection quantity Ti, thus the determined quantity of fuel being injected and supplied to the engine 1.

It is noted that the various kinds of corrections for the basic fuel injection quantity Tp include: various kinds of correction coefficients COEF including an incremental correction coefficient $K_{TW}$ based on an engine coolant temperature Tw representing an engine temperature and detected by a coolant (cooling water) temperature sensor 14; an air-fuel mixture ratio feedback correction coefficient $\alpha$ to carry out a feedback correction so that an actual air-fuel mixture ratio is coincident with a target air-fuel mixture ratio (for example, a stoichiometric air/fuel mixture ratio); a correction coefficient Ts to correct a variation in an ineffective fuel injection time duration of each fuel injection valve 8 due to a variation in a vehicular battery voltage.

The air-fuel mixture ratio feedback correction coefficient $\alpha$ is set in a proportional-integral (PI) control mode so that the actual air-fuel mixture ratio approaches to the stoichiometric air-fuel mixture ratio. The air-fuel mixture ratio feedback correction coefficient $\alpha$ is determined according to whether an actual fuel mixed with fuel supplied to the engine 1 is rich or lean with respect to the target air-fuel mixture ratio on the basis of an oxygen concentration in the exhaust gas detected by an oxygen (concentration) sensor 16 interposed within the exhaust passage 20.

Referring to FIG. 1A, a three-way catalytic converter 17 is installed in a portion of the exhaust passage 20 which is located at a downstream position of the oxygen sensor 16 so as to oxidize and reduce CO, HC, and $NO_x$ in the exhaust gas. A muffler 18 is installed at a downstream position of the catalytic converter 17.

In addition, an ignition plug 11 is disposed within each cylinder of the engine 1. A high voltage generated at an ignition coil 12 is sequentially applied to each ignition plug 11 in a predetermined order via a distributor 13 so that the air-fuel mixture is sparked, burned, and combusted. The generation timing of the high voltage to be applied to each ignition plug 12 is controlled via a power transistor 12a attached in a housing of the ignition coil 12. Hence, the control of ADV (ignition advance angle value) is carried out by means of the ignition signal derived from the control unit 9. It is noted that the ignition device may alternatively comprise such as the ignition coil 12 and the power transistor 12a, both of them being installed for each cylinder and the wiring from the distributor 13 is not carried out (so-called, distributor-less ignition device).

The control unit 9 calculates and processes the various kinds of input signals and determines an optimum ignition timing (ignition timing advance angle value) ADV and supplies the ignition signal to the power transistor 12a so that the ignition occurs at the related ignition timing ADV.

In details, the control unit 9 searches for the ignition timing ADV on the corresponding drive condition from a map of a basic ignition timing set so as to correspond to the basic fuel injection quantity.

In more details, the CPU searches for the ignition timing ADV corresponding to the driving condition from a basic ignition timing map previously set according to the driving condition., i.e., the engine revolution speed N and basic fuel injection quantity Tp representing the engine load, starts the power supply to a primary winding of the ignition coil 12 so as to interrupt the power supply when the ignition timing ADV is detected on the basis of the detection signal of the crank angle sensor 10, thus a secondary winding of any one of the ignition coils 12 which cylinder is in the ignition order generating the high voltage. Consequently, the spark ignition is carried out through the corresponding coil 12.

U.S. Pat. Nos. 4,658,789 (issued on 25 Apr. 21, 1987) and 4,660,535 (issued on Apr. 28, 1987) exemplify the ignition timing control system and method, the disclosures of which being herein incorporated by reference.

In the engine 1 to which the control apparatus according to the present invention in the embodiment is applicable, a secondary air supply tube 19 is communicated into the exhaust passage 20 which supplies an external air of the engine as a secondary air to the exhaust passage 20 upstream to the three-way catalytic converter 17. The secondary air from an electric motor type air pump 21 is supplied to the exhaust passage 20 via the secondary air supply tube 19. The electric motor type air pump 21 includes the electric motor (DC motor) which is turned on or off according to a command issued from the control unit 9. Accordingly, the supply of the secondary air is in the on-and-off control mode.

The fuel supply control and the ignition timing control are carried out in the embodiment by the control unit 9 in accordance with a program flowchart shown in FIG. 2.

The flowchart shown in FIG. 2 is carried out whenever a predetermined time has passed.

As shown in FIG. 2, the CPU of the control unit 9 reads the above-described incremental correction coefficient $K_{TW}$ to make the incremental correction for the basic fuel injection quantity Tp according to the coolant temperature $T_W$ detected by the engine coolant temperature sensor 21.

At a step S2, the CPU determines whether the air pump 21 is turned on or off.

If the air pump 21 is turned on (YES), the routine goes to a step S3 in which the CPU determines whether the throttle sensor 15 detects the fully closed position of the throttle valve 7.

If the throttle sensor 15 detects the fully closed position of the throttle valve 7 (YES at the step S3) and the CPU, thus, determines that the engine falls in the idling state, the routine goes to a step S4.

In this way, when the air pump 21 is turned on and the secondary air supply is carried out by the air pump 21 (Yes at the step S3), the routine goes to the step S4.

At the step S4, the CPU calculates an incremental correction coefficient for fuel (in this case, KAP, incremental quantity (correction) percentage) such that an excess coefficient (air-fuel mixture ratio) at an inlet portion of the three-way catalytic converter 17 gives a predetermined value.

Figure 3:
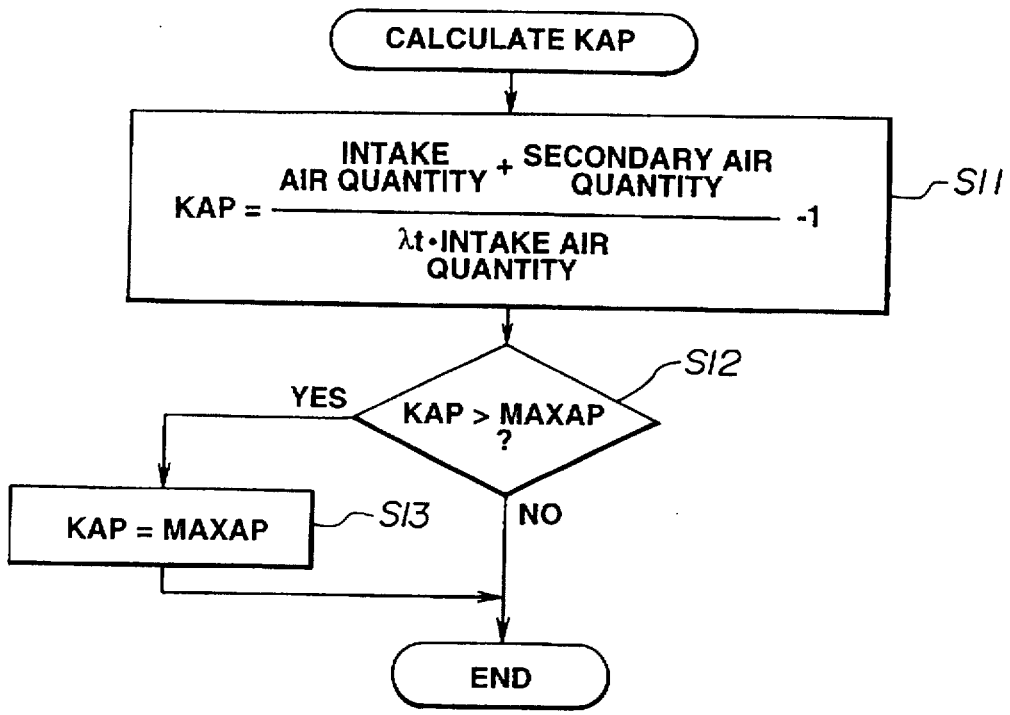
FIG. 3 is an operational flowchart executed by the control unit for explaining an example of a determination of an incremental correction coefficient of fuel (KAP).

It is noted that FIG. 3 shows a detailed flowchart (a subroutine of the step S4) for setting the incremental correction coefficient KAP.

In the flowchart of FIG. 3, the subroutine goes to a step S11 in which the incremental correction coefficient (KAP) to make the actual excess coefficient at the inlet of the three-way catalytic converter 17 coincident with the target value $\lambda_r$ on the basis of the target value $\lambda_r$ (>1.0) of the excess coefficient at the inlet of the three-way catalytic converter 17, the intake air quantity Q detected by the airflow meter 6, and the given quantity of secondary air supplied to the portion of the exhaust passage upstream to the catalytic converter. That is to say, the incremental correction coefficient KAP is calculated as follows:

$$KAP = (\text{intake air quantity} + \text{secondary air quantity})/(\lambda_r \times \text{intake air quantity}) - 1 \quad (1).$$

It is noted that in the equation (1), the secondary air quantity is determined by the control unit 9 on the basis of a previously derived capacity of the secondary air pump 21 and driven rotation speed thereof.

That is to say, the excess coefficient at the inlet of the three-way catalytic converter 17 is determined by a total sum of the intake air quantity and secondary air quantity and the fuel quantity controlled according to the engine intake air quantity.

Hence, a total quantity of air in the engine 1 such that the excess coefficient would give a target value $\lambda_r$ if the fuel whose quantity corresponds to the basic fuel injection quantity Tp were supplied to the engine 1 is determined on the basis of the intake air quantity of the engine and the target excess coefficient $\lambda_r$ and the incremental correction coefficient KAP is determined on the basis of a ratio between the actual total quantity (intake air quantity+secondary air given quantity) and the total quantity to determine the target value $\lambda_r$.

Hence, as the secondary air quantity is excessive and the excess coefficient at the inlet of the catalytic converter 17 becomes larger than the target value $\lambda_r$, the incremental correction coefficient KAP is set to the larger value.

At a step S12, the CPU compares the incremental correction coefficient KAP with a previously proposed upper limit (maximum value) MAXAP.

If the incremental correction coefficient KAP calculated at the step S11 exceeds the upper limit value MAXAP, the subroutine goes to a step S13 in which the upper limit value MAXAP is set as the incremental correction coefficient KAP so as to avoid the incremental correction of the fuel injection quantity by the incremental correction coefficient KAP exceeding the upper limit value MAXAP.

On the other hand, Referring to FIG. 2, if the air pump 21 is in the OFF state (NO at the step S2) or if the CPU of the control unit 9 determines that the engine 1 does not fall in the engine idling state, the routine goes to a step S5 in which the incremental correction coefficient KAP is set to zero. In this case, the incremental correction for fuel to control the excess coefficient at the inlet of the catalytic converter 17 is not substantially carried out.

At the step S6, the CPU selects a larger one of either the incremental correction coefficient $K_{TW}$ read at the step S1 or the incremental correction coefficient KAP to control the excess correction at the inlet of the catalytic converter 17.

Consequently, the selected incremental correction coefficient ($K_{TW}$ or KAP) is set as the correction coefficient for fuel (incremental quantity percentage) at the present routine of FIG. 2.

The incremental correction coefficient KAP is the fuel incremental correction value to compensate for an insufficient quantity of fuel so as to achieve the predetermined excess coefficient at the inlet of the catalytic converter 17 if the basic fuel injection quantity Tp is directly injected to the engine 1. Hence, if the incremental correction coefficient $K_{TW}$ determined according to the engine coolant temperature exceeds the incremental correction coefficient KAP, the excess coefficient at the inlet of the catalytic converter 17 does not equal to or exceed the predetermined value due to the normally used incremental correction using the incremental correction coefficient $K_{TW}$. Hence, the normal incremental correction by means of the incremental correction coefficient $K_{TW}$ is directly executed through the control unit 9.

On the other hand, if the one fuel incremental correction coefficient KAP exceeds the other incremental correction coefficient $K_{TW}$, the fuel incremental quantity becomes insufficient by which the basic fuel injection quantity Tp is incremental corrected according to the normal incremental correction coefficient $K_{TW}$ based on the coolant temperature so that the excess coefficient at the inlet of the catalytic converter 17 exceeds the predetermined value. Thus, the incremental correction for the basic fuel injection quantity Tp with the other incremental correction coefficient KAP having the larger value is carried out in place of the other incremental correction coefficient $K_{TW}$.

Hence, if the larger one of either the incremental correction coefficient $K_{TW}$ or the incremental correction coefficient KAP is selected, it can be avoided that the excess coefficient at the inlet of the catalytic converter 17 is equal to or above the predetermined value (the actual air-mixture ratio becomes leaner than the target air-fuel mixture ratio). Hence, an after-burn of the exhaust gas can be promoted by means of the supply of secondary air and the catalytic converter 17 is prevented from being cooled due to the supply of the secondary air.

It is noted that although, in the embodiment described above, the normal correction of the basic fuel injection quantity Tp is represented by the incremental correction coefficient $K_{TW}$ based on the coolant temperature, the total value of the other incremental correction coefficients COEF, α, and/or Ts including the incremental correction coefficient $K_{TW}$ may alternatively be compared with the incremental correction coefficient denoted by KAP described above at the step S6.

Referring back to FIG. 2, at a step S7, the CPU sets a retardation angle correction value (a minus correction value to decrease the ignition advance angle value) of the ignition timing according to a difference between the incremental correction coefficient KAP and the incremental correction coefficient $K_{TW}$.

In the embodiment, as the difference between the incremental correction coefficient KAP and the incremental correction coefficient $K_{TW}$ becomes larger, in other words, as the fuel injection quantity through each fuel injection valve 8 is incremental corrected which is larger than the normal correction coefficients in the basic fuel injection quantity, the ignition timing becomes largely retarded by the retardation correction value. On the other hand, if, at the step S6, the incremental correction coefficient $K_{TW}$ is selected, no need to correct the incremental correction coefficient KAP is carried out, and the normal incremental correction is carried out using, for example, $K_{TW}$, the retardation correction value is set to zero so that no retardation correction of the ignition timing is carried out. Namely, if KAP−$K_{TW}$ indicates a minus value or zero, no retardation for the basic advance angle (ADV) is carried out.

Figure 6:
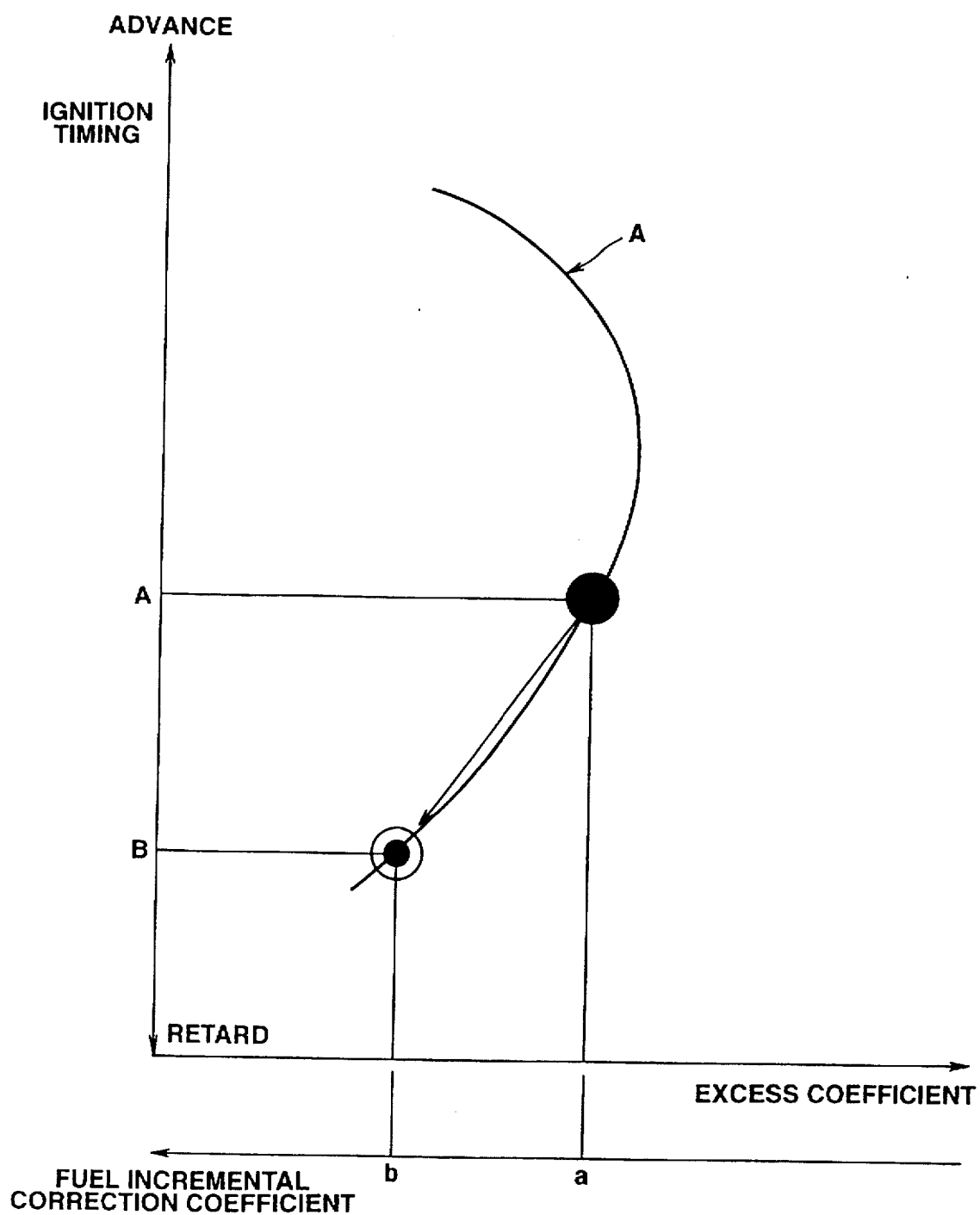
FIG. 6 is a characteristic graph representing a relationship between the ignition timing, the excess coefficient, and the incremental correction coefficient of fuel.

If the incremental correction coefficient KAP is larger than the incremental correction coefficient $K_{TW}$ and the incremental correction coefficient KAP is selected at the step S6, the fuel injection quantity is increased than the normally carried out injection quantity. Along with the increment of the fuel injection quantity, the ignition timing can be retarded with the stability of engine maintained (refer to FIG. 6). In FIG. 6, an oblique characteristic line denoted by A denotes the engine stability and a minus value from A to B in a longitudinal axis of FIG. 6 denotes the retardation correction value of the ignition timing.

That is to say, since the combustion stability (engine stability) is improved according to the increase in the fuel injection quantity, the engine stability is not affected by the retardation of the ignition timing even if the ignition timing is more retarded so that a margin of the retardation of the ignition timing is developed by the increase in the fuel injection quantity.

Therefore, at the step S7 of FIG. 2, the ignition timing is more retarded than ever (the normal ignition timing angle value (ADV)) as the incremental correction coefficient KAP becomes larger than the incremental correction coefficient $K_{TW}$ so that the ignition timing is retarded with the engine stability maintained and the increase in the exhaust gas temperature is promoted.

At a step S8 of FIG. 8, the basic fuel injection quantity Tp is increased and corrected on the basis of either of the larger incremental correction coefficient KAP or $K_{TW}$ set at the step S6 as the incremental quantity percentage so that the final fuel injection quantity Ti (Ti=Tp×(1+selected correction coefficient)+Ts) is calculated.

In addition, at the step S8, the ignition timing is corrected and set on the basis of the calculated retardation correction value calculated at the step S7.

Thus, the control unit 9 outputs the pulse signal having the pulsewidth corresponding to the fuel injection quantity Ti to any fuel injection valve 8 in the predetermined order and outputs the ignition signal to the ignition coil 12 at the ignition timing retarded by the retardation angle correction (quantity) at the step S8.

In this way, in the embodiment described above, during the idling state with the low exhaust gas temperature, the incremental correction of the fuel injection quantity can assuredly avoid such a state that the secondary air becomes excessive so that the excess coefficient at the inlet portion of the catalytic converter 17 exceeds the predetermined value. On the other hand, the ignition timing is retarded according to the retardation angle correction margin developed due to the increase in the fuel injection quantity so that the exhaust gas temperature can be increased with the engine stability maintained.

That is to say, the development in the cooling effect of the secondary air quantity on the catalytic converter 17 due to the excessive quantity of the secondary air can be prevented and the after-burn of CO and HC and the increase in the exhaust gas temperature due to the retardation angle correction can stably increase the temperature in the exhaust gas flowing through the catalytic converter 17. Consequently, the temperature in the catalytic converter 17 can be increased and the exhaust gas purification action can effectively be exhibited by the catalytic converter 17.

In the above-described embodiment, the incremental correction coefficient KAP is calculated in accordance with the equation 1. Suppose that the secondary air quantity is approximately constant (given quantity of secondary air), a required value of the incremental correction coefficient KAP is varied according to the intake air quantity of the engine 1 and the intake air quantity during the engine idling is a bypass airflow quantity supplied via a bypass passage of the throttle valve and is generally increased as the cooling water (coolant) temperature is lower at a time when the engine enters the engine idling state.

Figure 4:
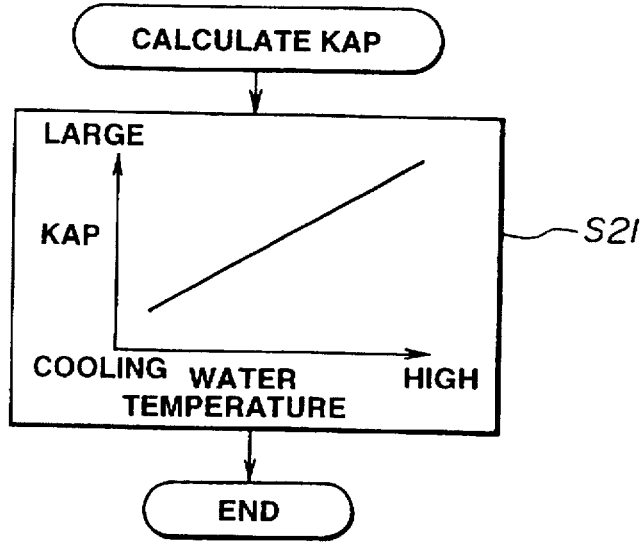
FIG. 4 is an operational flowchart executed by the control unit for explaining another example of the determination of the incremental correction coefficient of fuel (KAP).

Hence, as shown in a flowchart of FIG. 4, the incremental correction coefficient KAP may simply be set according to the coolant water temperature $T_W$.

At a step S21 in the flowchart of FIG. 4, the CPU of the control unit 9 refers to a map in which the incremental correction coefficient KAP is previously stored according to a coolant temperature $T_W$ so as to search for the incremental correction coefficient KAP corresponding to the present cooling water temperature.

It is, herein, noted that as the coolant (cooling water) temperature is lower, the intake air quantity during the engine idling is increased so that the influence of the secondary air on the excess coefficient at the inlet of the catalytic converter 17 becomes less. Hence, the incremental correction coefficient KAP stored in the map is set to a larger value as the cooling water temperature is higher and the intake air quantity during the engine idling is smaller.

Next, if an provision or elimination (in an ON or OFF manner) of the incremental correction by means of the incremental correction coefficient KAP is carried out for the basic fuel injection quantity Tp, the fuel injection quantity is abruptly varied and an abrupt change in the engine output is resulted.

In addition, the provision or elimination (in the ON or OFF manner) of the retardation angle correction of the ignition timing is carried out in the embodiment shown in FIG. 2.

Especially, when the incremental correction coefficient KAP is relatively large and the large retardation angle correction is carried out, a large engine vibration (and vehicular body vibration) would occur when the supply of secondary air is cut off (halted) and/or when the engine driving state is transferred from the engine idling state to a non-idling condition.

Hence, to prevent such abrupt transient states as described above, the fuel incremental correction quantity (percentage) may gradually be increased, as an alternative of the embodiment, from the correction level for the basic fuel injection quantity Tp carried out by the other incremental correction coefficient $K_{TW}$ when the supply of secondary air is carried out, the engine driving condition is transferred from the non-idling state to the idling state, and the fuel injection quantity correction using the incremental correction coefficient KAP is carried out and the increased fuel incremental correction quantity (percentage) may gradually be decreased to return to the correction level for the basic fuel injection quantity Tp carried out by the other incremental correction coefficient $K_{TW}$ when the supply of secondary air is halted or the engine driving condition is transferred from the engine idling state to the non-idling state, the fuel injection quantity correction using the incremental correction coefficient KAP being carried out.

Figure 5:
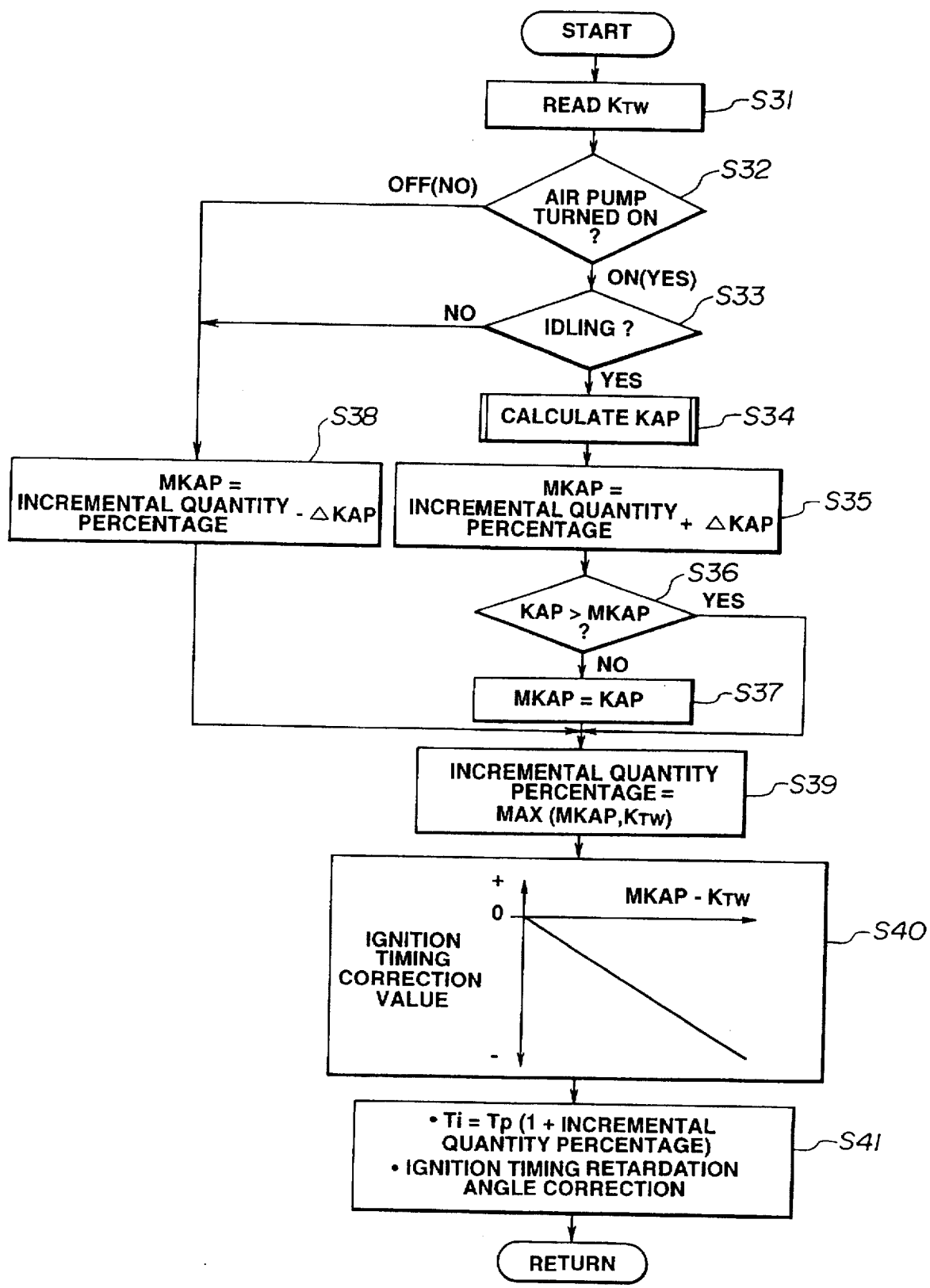
FIG. 5 is an operational flowchart executed by the control unit in an alternative of the embodiment for explaining another control operation of the fuel injection quantity and of the ignition timing.

FIG. 5 shows an operational flowchart of the fuel supply quantity control and the retardation angle correction coefficient control as the alternative of FIG. 2.

In the flowchart of FIG. 5, when the air pump 21 is turned on (Yes at a step S32) and the engine idling state occurs (Yes at a step S33), the fuel incremental correction coefficient KAP is calculated as shown in the flowchart of FIG. 3 or 4.

At a step S35 of FIG. 5, the CPU sets the present incremental quantity percentage (incremental correction coefficient MKAP) derived at the present time which is the addition of a predetermined value ΔKAP to the previous incremental quantity percentage derived at the previous time (previously executed routine of FIG. 5). At the next step S36, the CPU of the control unit 9 determines whether the incremental correction coefficient MKAP has exceeded the incremental correction coefficient KAP set at a step S34.

If the incremental correction coefficient MKAP is equal to or above the incremental correction coefficient KAP (NO at the step S36), the routine goes to a step S37 in which the value of the incremental correction coefficient KAP is set to the incremental correction coefficient MKAP so that the incremental correction coefficient MKAP does not exceed the incremental correction coefficient KAP.

On the other hand, with the air pump 21 turned off (NO at the step S32) or with the engine in the non-idling state (NO at the step S33), the routine goes to a step S38. At the step S38, the value of the previous incremental correction quantity percentage from which the predetermined value ΔKAP is subtracted is set as the incremental correction coefficient MKAP and the incremental correction coefficient MKAP is gradually decreased to zero.

At a step S39, the CPU of the control unit 9 selects a larger one of either the incremental correction coefficient MKAP or the normally used incremental correction coefficient $K_{TW}$ as the incremental correction quantity percentage.

Steps of S40 and S41 are generally the same as those steps of S7 and S8 of FIG. 2.

As described above with reference to FIG. 5, when the air pump 21 is turned ON and the engine idling driving condition is established from a state wherein the air pump 21 is turned OFF or the engine driving condition falls in the non-idling state and the normal correction coefficient $K_{TW}$ is selected as the incremental correction quantity percentage, the incremental correction coefficient MKAP is increased gradually in a stepwise manner as a unit of the predetermined value ΔKAP from a level corresponding to the normally used incremental correction coefficient $K_{TW}$ and finally increased up to the incremental correction coefficient KAP. Even if the incremental correction coefficient KAP is larger than the normally used incremental correction coefficient KAP, the incremental correction quantity does not vary in the ON (provision) manner. In addition, in a case where the air pump 21 is transferred to the OFF state (S32) or the engine driving state is transferred to the non-idling state (S33) from a state in which the incremental correction by the correction level by means of the incremental correction coefficient KAP is carried out, the incremental correction quantity is decreased gradually in a stepwise manner as a unit of ΔKAP up to the normal level. Hence, the fuel incremental correction quantity does not vary in a step difference manner and the generation of the vehicular body vibration due to the abrupt change in the engine output can be avoided.

In addition, at a step S40, since the retardation correction value is set using the incremental correction coefficient MKAP, the abrupt changes in the retardation angle correction value and in the engine output do not occur.

It is noted that since the excess coefficient is defined as a rate of the air-fuel mixture ratio to the stoichiometric air-fuel mixture ratio, the excess coefficient at the inlet portion of the catalytic converter is estimated on the basis of the supplied quantity of secondary air and the air-fuel mixture ration detected by the oxygen concentration sensor 16.

What is claimed is:

1. A control apparatus for an internal combustion engine, comprising:
   a) secondary air supplying means, having an air pump, for operatively supplying a secondary air into a portion of an exhaust passage of the engine located upstream with respect to a three-way catalytic converter interposed in the exhaust passage;
   b) engine driving condition detecting means for detecting an engine driving condition, said engine driving condition detecting means including an engine idling sensor which is so constructed and arranged as to detect whether the engine enters an engine idling state, an airflow meter which is so constructed and arranged as to detect an intake air quantity supplied to the engine, and an air-fuel mixture ratio sensor which is so constructed and arranged in the portion of the exhaust passage located upstream with respect to the catalytic converter as to detect an air-fuel mixture ratio of the engine;
   c) a control unit which is so constructed and arranged as to determine whether the engine falls in the idling state and determine whether the secondary air is supplied by said secondary air supplying means to the portion of the exhaust passage of the engine located upstream with respect to the catalytic converter, as to determine a basic fuel supply quantity on the basis of the detected engine driving condition and a supplied quantity of the secondary air, as to estimate an excess coefficient at an inlet portion of the catalytic converter on the basis of the detected air/fuel mixture ratio and the supplied quantity of the secondary air when determining that the engine falls in the idling state and that the secondary air is supplied into the portion of the exhaust passage located upstream with respect to the catalytic converter, as to determine an incremental correction quantity percentage of fuel supplied to the engine for the basic fuel supply quantity so that the excess coefficient gives a predetermined value, and as to determine a retardation correction quantity of an ignition timing for a basic ignition advance angle value according to the determined incremental correction percentage;
   d) fuel supplying means for supplying a final fuel supply quantity determined according to the basic fuel supply quantity and the incremental correction quantity percentage to the engine derived by said control unit; and
   e) an ignition device which is so constructed and arranged as to ignite the fuel supplied to the engine at the basic ignition timing advance angle value which is retarded by the retardation correction quantity determined by said control unit.

2. A control apparatus for an internal combustion engine as claimed in claim 1, wherein said incremental correction quantity percentage comprises an incremental correction coefficient (KAP) derived on the basis of the intake air quantity, the secondary air supplied quantity, and a target excess coefficient ($\lambda t$), said target excess coefficient at the inlet portion of the catalytic converter, the target excess coefficient being determined such that the excess coefficient at the inlet portion of the catalytic converter would give the target excess coefficient if the basic fuel supply quantity were supplied to the engine.

3. A control apparatus for an internal combustion engine as claimed in claim 2, wherein said control unit derives and sets the incremental correction coefficient (KAP) as follows:
   KAP=(intake air quantity+given quantity of secondary air)/($\lambda_t \times$intake air quantity), wherein $\lambda_t$ denotes the target excess coefficient at the inlet portion of the catalytic converter.

4. A control apparatus for an internal combustion engine as claimed in claim 3, wherein said incremental correction coefficient (KAP) is set to a larger value as the supplied quantity of the secondary air becomes larger and the excess coefficient at the inlet portion of the catalytic converter becomes larger than the target excess coefficient.

5. A control apparatus for an internal combustion engine as claimed in claim 4, wherein said control unit determines whether the incremental correction coefficient (KAP) exceeds a predetermined maximum value (MAXAP) and said control unit sets the predetermined maximum value (MAXAP) as the incremental correction coefficient (KAP) when determining that the incremental correction coefficient (KAP) exceeds the predetermined maximum value (MAXAP).

6. A control apparatus for an internal combustion engine as claimed in claim 1, wherein said engine driving condition detecting means further includes an engine cooling water temperature sensor which is so constructed and arranged as to detect an engine coolant temperature of the engine and wherein said control unit determines the incremental correction coefficient (KAP) of fuel supplied to the engine on the basis of the detected engine coolant temperature during the engine idling state with the air pump of said secondary air supplying means turned on so that the estimated excess coefficient gives the predetermined value.

7. A control apparatus for an internal combustion engine as claimed in claim 5, wherein said engine driving condition detecting means further includes an engine cooling water temperature sensor which is so constructed and arranged as to detect an engine coolant temperature of the engine and wherein said control unit determines another incremental correction coefficient ($K_{TW}$) of fuel supplied to the engine on the basis of the detected engine coolant temperature.

8. A control apparatus for an internal combustion engine as claimed in claim 7, wherein said control unit selects a larger one of either the incremental correction coefficient (KAP) or the other incremental correction coefficient ($K_{TW}$) as the incremental correction quantity percentage.

9. A control apparatus for an internal combustion engine as claimed in claim 8, wherein said control unit determines the retardation correction quantity according to a difference between the incremental correction coefficient (KAP) and the other incremental correction coefficient ($K_{TW}$).

10. A control apparatus for an internal combustion engine as claimed in claim 9, wherein said control unit decreases gradually the incremental correction coefficient (MKAP) when determining that the air pump of said secondary air supply means is turned off from the turned on state or determining that the engine driving condition is transferred from the idling state to a non-idling state.

11. A control apparatus for an internal combustion engine as claimed in claim 9, wherein said incremental correction coefficient (MKAP) is decreased gradually to zero in the following way: MKAP=MKAP (MKAP previously determined–ΔKAP (predetermined value).

12. A control apparatus for an internal combustion engine as claimed in claim 9, wherein said control unit increases gradually said incremental correction coefficient (MKAP) to the incremental correction coefficient (KAP) for the basic fuel supply quantity carried out when the secondary air is supplied and the engine driving condition falls in the idling state, when said air pump is turned on from the turned off state and when the engine driving condition is transferred from the non-idling state to the engine idling state.

13. A control apparatus for an internal combustion engine as claimed in claim 12, wherein said incremental correction coefficient (MKAP) is increased gradually in the following way: MKAP=MKAP (MKAP previously determined)+ ΔKAP (predetermined value).

14. A control apparatus for an internal combustion engine as claimed in claim 13, wherein said control unit determines the supplied quantity of secondary air according to a capacity of the air pump and a driven rotation speed of the air pump.

15. A method for controlling a fuel supply quantity and an ignition timing of an internal combustion engine, said engine being provided with a) secondary air supplying means, having an air pump, for operatively supplying a secondary air into a portion of an exhaust passage of the engine located upstream with respect to a three-way catalytic converter interposed in the exhaust passage; and b) engine driving condition detecting means for detecting an engine driving condition, said engine driving condition detecting means including an engine idling sensor which is so constructed and arranged as to detect whether the engine enters an engine idling state, an airflow meter which is so constructed and arranged as to detect an intake air quantity supplied to the engine, and an air-fuel mixture ratio sensor which is so constructed and arranged in the portion of the exhaust passage located upstream with respect to the catalytic converter as to detect an air-fuel mixture ratio of the engine, said method comprising the steps of;

c) determining whether the engine falls in the idling state and whether the secondary air is supplied by said secondary air supplying means to the portion of the exhaust passage of the engine located upstream with respect to the catalytic converter;

d) determining a basic fuel supply quantity on the basis of the detected engine driving condition and a quantity of the secondary air;

e) estimating an excess coefficient at an inlet portion of the catalytic converter on the basis of the detected air/fuel mixture ratio and a supplied quantity of the secondary air when determining that the engine falls in the idling state and that the secondary air is supplied into the portion of the exhaust passage located upstream with respect to the catalytic converter;

f) determining an incremental correction quantity percentage of fuel supplied to the engine for the basic fuel supply quantity so that the excess coefficient gives a predetermined value; and g) determining a retardation correction quantity of an ignition timing for a basic ignition advance angle value according to the determined incremental correction percentage.

* * * * *